Dec. 28, 1937.   H. A. STILSON   2,103,877
ANIMAL TRAP
Filed Feb. 6, 1936
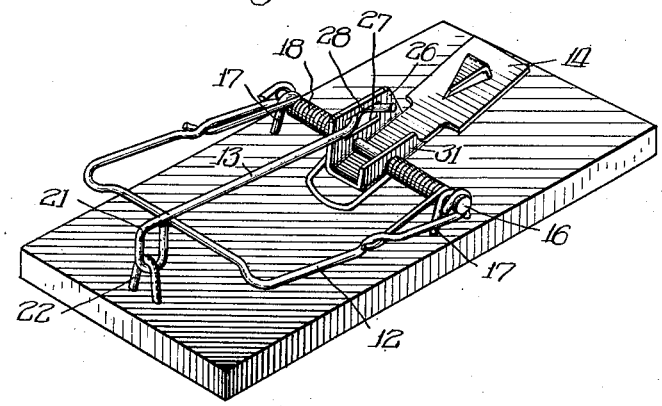
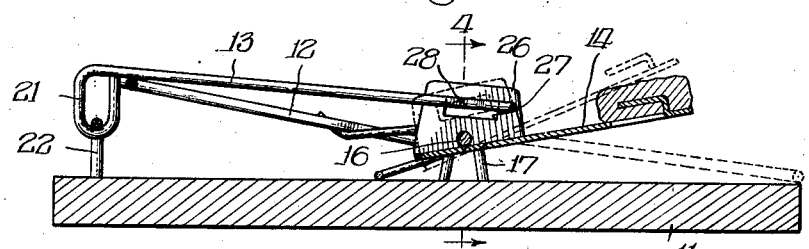
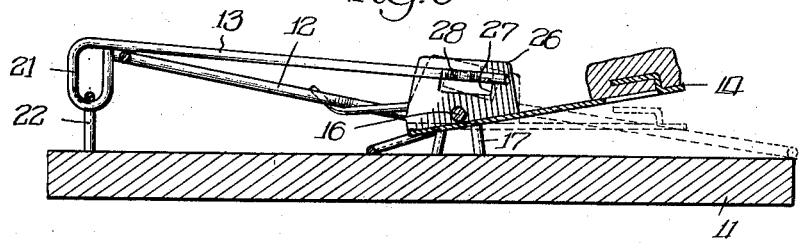
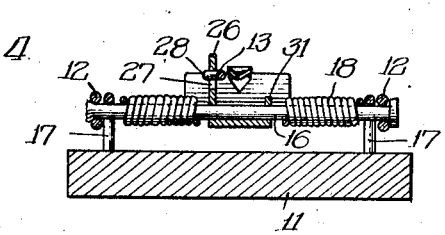
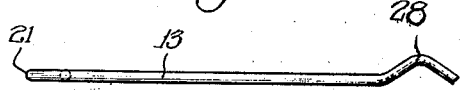
Inventor:
Herbert A. Stilson,
By Toorman L. Mueller
atty.

Patented Dec. 28, 1937

2,103,877

UNITED STATES PATENT OFFICE 2,103,877

ANIMAL TRAP

Herbert A. Stilson, Chicago, Ill.

Application February 6, 1936, Serial No. 62,609

4 Claims. (Cl. 43—81)

This invention relates to animal traps, and has been illustrated as embodied in a trap of a type especially suitable for catching mice or rats.

Traps of this general nature have long been known, and in comparatively recent years have been greatly improved. One of the best traps heretofore known is that illustrated in Patent No. 1,530,918 issued March 24, 1925, to Will C. Stilson and the present inventor. One of the main features of that trap is its release mechanism which is very sensitive and works in various directions, and which is fairly economical in cost.

According to the present invention another form of release mechanism is provided which can be manufactured even more economically, and which it is believed can be made even more sensitive in mass production than it is commercially practical to make the trap of said prior patent under like conditions of mass production. The present invention accomplishes this by avoiding the necessity for exactitude in manufacture. Instead of using a latch release member which must be very carefully shaped, this invention provides a latch release member of a simple shape which needs only to approximate its intended shape.

An object of the invention therefore is to provide a trap of great sensitivity which can be satisfactorily manufactured more cheaply than such traps heretofore known.

Another object of the invention is to provide a trap more sensitive than previous traps, especially when made in mass production.

A further object of the invention is to provide a trap which is more dependable than previous traps, and which is even harder to injure by abusive handling.

Other objects and advantages of my invention will be apparent from the following description, taken with the drawing, in which:

Fig. 1 is a perspective view of the trap chosen for illustration of this invention.

Fig. 2 is a vertical longitudinal sectional view of the trap shown in Fig. 1.

Fig. 3 is a view similar to Fig. 2, but indicating a different release movement.

Fig. 4 is a sectional view along the line 4—4 of Fig. 2.

Fig. 5 is a top plan view of the trigger, showing the elbow therein.

Although this invention may take numerous forms, only one has been chosen for illustration. In this form the trap includes the base 11, the jaw 12, the trigger or latch 13, and the bait-treadle 14. The jaw pivots about a spindle 16 which is secured in place by staples 17. A spring 18 urges the jaw from the set position shown in Fig. 1 toward the released position shown in dotted lines in Figs. 2 and 3. The bait-treadle 14 is also pivotally mounted on the spindle 16. The latch 13 is preferably a piece of stiff wire having a loop 21 formed at one end and engaging a staple 22.

The engagement of the latch 13 with the treadle 14 is an important part of this invention. The treadle 14 has an upstanding extension 26 which is formed thereon by a stamping operation and which is provided with an opening 27 having an upper edge which comprises a latch seat, since the pressure of the jaw against the latch urges the latch against this upper edge. The end of the latch is provided with an elbow 28 therein, which elbow is so shaped that it may project into the slot 27, as illustrated in Fig. 1, and the two sides of the bend will bear against the end edges of the slot 27. It follows that if the treadle 14 is moved either up or down, the relative movement between the slot 27 and the bend 28 of latch 13 will cause the latch to be pushed out of the slot 27. It is not necessary for the treadle to be moved far enough to push the latch all the way out of the slot, because once the latch is moved to a position where a rounded part of the latch is bearing on the treadle under the tension of the jaw, this tension will urge the latch, sliding on the rounded surface of the wire, the rest of the way out of the slot. In other words, the jaw will snap as soon as the latch has been moved past the dead center position.

It will be observed that there is no need for extreme accuracy in any part of this trap. In the prior patent referred to, the latch seat had to be very carefully shaped so that it would hold the latch reliably and yet release it easily. In the present invention the latch seat is not shaped at all in the sense of being bent to a particular shape, and although the upstanding extension 26 is bent from the treadle 14, there is no need for it to be exactly vertical, since the edges of the slot will function properly through quite a wide range of possible angles of inclination of the extension 26. In other words, commercial production methods would never cause the extension 26 to be far enough from the vertical so that the trap would not work properly. Likewise, the latch 13 does not have to be positioned exactly. If it is anywhere near the intended position it will release properly, since it will merely position the treadle a little higher or a little lower, or will have the result that the elbow 28 will not project into the slot quite as far as was intended. It is preferred, however, that the elbow of the latch be so positioned that when the trap is set the elbow will be in engagement with the two end walls of slot 27. However, this is a matter which is not very troublesome commercially, especially since, if the elbow is not properly positioned when the trap is inspected, the necessary adjustment may easily be made simply by bending the staple 22 the required amount. However, in ordinary commercial practice such adjustment will rarely be necessary.

The height of slot 27, that is the distance between its upper and lower seats, should be considerably in excess of the thickness of the wire of latch 13, so that the latch will not prevent pivoting of the treadle. It is of course desirable that the elbow 28 be formed fairly accurately, but by having it ordinarily project a little farther than necessary into the slot 27, considerable tolerance is provided in this respect. If the elbow is formed a little more sharply than usual it will project into the slot slightly farther than usual, but will still release properly. If it is formed slightly less sharply than usual it will not project into the slot quite as far as usual, but will still project far enough to latch properly. It is obvious that because of the absence of any requirements for absolute exactitude the cost of manufacture of this trap is considerably reduced.

The cost of manufacture of the trap may be further reduced by using the extension 26 as one of the support or pivoting members for the treadle 14. Another upward extension 31 may be provided on the other side of the treadle 14, and alined holes provided in these two upward extensions through which the spindle 16 is threaded in assembly of the trap.

Although the trap is economical to manufacture, it is nevertheless exceedingly sensitive. Movement of the treadle in releasing the trap causes very little if any downward movement of the latch against the tension of the jaw exerted thereon. Furthermore, since the edges of the slot 17 engage only the rounded portions of the wire 13, ease of sliding of one part on another is assured. The necessary movement of the treadle in releasing the trap can be made as little as desired by shaping the elbow 28 so that it projects less far into the slot 27.

Operation

The operation of the trap is clear from Fig. 1, in which the trap is shown in the "set" position. In its released position the jaw 12 would be at the right hand position shown in dotted lines in Fig. 2. To set the trap, the jaw is swung over to the position shown in Fig. 1 and held down with one hand, the latch 13 is brought down over the jaw and its elbow 28 inserted into the slot 27, whereupon the hand may be removed from the jaw and the trap is set. In seeking to get the bait which has previously been applied to the bait treadle 14, the mouse will move the treadle, and the movement of the edges of the slot 27 with respect to the elbow 28 will thrust the elbow partly out of the slot until the tension of the spring 18 completes the release and snaps the trap to catch the mouse.

Although but one embodiment of my invention has been herein shown and described, it is understood that I am not limited thereby, but limit my invention only by the scope of the appended claims

I claim:

1. An animal trap including a base, a jaw pivoted on said base, a spring urging said jaw to a closed position, and jaw retaining and releasing means including a latch for engaging said jaw, and a treadle, said treadle being pivoted about a horizontal spindle secured to said base and including a flat bottom portion, one end of which has bait-retaining means thereon, and the other end of which has a pair of extensions bent therefrom, and a pair of alined holes in said extensions through which said spindle extends, one of said extensions having a slot therein, and said latch having an elbow formed thereon for projecting into said slot, said slot and elbow being so shaped that when said treadle is pivoted, said latch is expelled from said slot.

2. An animal trap including a base, a jaw pivoted on said base, a spring urging said jaw to a closed position, and jaw retaining and releasing means including a latch for engaging said jaw, and a treadle, said treadle being pivoted about a horizontal spindle secured to said base and including a flat bottom portion, one end of which has bait-retaining means thereon, and the other end of which has a pair of extensions bent therefrom, and a pair of alined holes in said extensions through which said spindle extends, one of said extensions having a slot therein, and said latch having an elbow formed thereon for projecting into said slot, said slot and elbow being so shaped that when said treadle is pivoted, said latch is expelled from said slot, the height of said slot being considerably greater than the thickness of said latch, whereby locking of said slot against said latch is prevented and considerable tolerance in the formation and positioning of said elbow is permitted.

3. An animal trap including a base, a jaw pivoted on said base, a spring urging said jaw to a closed position, and jaw retaining and releasing means including a latch for engaging said jaw, and a treadle, said treadle being pivoted about a horizontal spindle secured to said base and including a flat bottom portion, one end of which has bait-retaining means thereon, and the other end of which has a pair of extensions bent therefrom, and a pair of alined holes in said extensions through which said spindle extends, one of said extensions having a formation engaging said latch to hold the trap set but releasing it when said treadle is pivoted.

4. An animal trap including a base, a jaw pivoted on said base, a spring urging said jaw to a closed position, and jaw retaining and releasing means including a latch for engaging said jaw, and a treadle, said treadle being pivoted about a horizontal spindle secured to said base and including a flat bottom portion, one end of which has bait-retaining means thereon, and the other end of which has an extension bent therefrom, and a hole in said extension through which said spindle extends, said extension having a slot therein, and said latch having an elbow formed thereon for projecting into said slot, said slot and elbow being so shaped that when said treadle is pivoted, said latch is expelled from said slot.

HERBERT A. STILSON.